US010899641B2

(12) United States Patent
de Boer et al.

(10) Patent No.: US 10,899,641 B2
(45) Date of Patent: Jan. 26, 2021

(54) DEGASSING DEVICE FOR ANAEROBIC PURIFICATION DEVICE

(71) Applicant: Paques I.P. B.V., Balk (NL)

(72) Inventors: Jelle Hendrik de Boer, Balk (NL); Antonius Bernardus Vallinga, Sneek (NL); Veronica Henrika Johanna Groot Kormelinck, Joure (NL); Leonard Hubertus Alphonsus Habets, Sneek (NL); Jacob Cornelis Theodorus Vogelaar, Balk (NL)

(73) Assignee: Paques I.P. B.V., Balk (NL)

( * ) Notice: Subject to any disclaimer, the term of this patent is extended or adjusted under 35 U.S.C. 154(b) by 0 days.

(21) Appl. No.: 16/329,232

(22) PCT Filed: Sep. 4, 2017

(86) PCT No.: PCT/EP2017/072123
§ 371 (c)(1),
(2) Date: Feb. 28, 2019

(87) PCT Pub. No.: WO2018/042039
PCT Pub. Date: Mar. 8, 2018

(65) Prior Publication Data
US 2019/0185356 A1 Jun. 20, 2019

(30) Foreign Application Priority Data

Sep. 2, 2016 (EP) ..................... 16187135

(51) Int. Cl.
*B01D 19/00* (2006.01)
*C02F 1/20* (2006.01)
(Continued)

(52) U.S. Cl.
CPC ........ *C02F 3/2846* (2013.01); *B01D 19/0057* (2013.01); *C02F 1/20* (2013.01);
(Continued)

(58) Field of Classification Search
CPC ........ C02F 3/2846; C02F 3/2873; C02F 1/20; B01D 19/0057
(Continued)

(56) References Cited

U.S. PATENT DOCUMENTS 4,053,291 A * 10/1977 Sims ................. B01D 19/0057
96/209
8,066,878 B2 * 11/2011 Vellinga ................. C12M 23/36
210/603

(Continued)

*Primary Examiner* — Claire A Norris
(74) *Attorney, Agent, or Firm* — N.V. Nederlandsch Octrooibureau; Catherine A. Shultz; Katelyn J. Bernier (57) ABSTRACT

A gas-liquid separation device (30) for an anaerobic purification device for purification of wastewater, the gas-liquid separation device comprising:
a gas-liquid riser pipe (32);
a separation pipe (34) attached to the gas-liquid riser pipe (32), the separation pipe defining an angle with the direction perpendicular to the gas-liquid riser pipe between −45 degrees and +45 degrees, the separation pipe (34) configured to receive fluid from the gas-liquid riser pipe (32);
at least one pipe gas outlet (35) located, when assembled with an anaerobic purification device, in a surface along the separation pipe (34) facing away from the ground, the at least one pipe gas outlet (35) configured to lead at least a portion of the gas in the separation pipe (34) outside the gas-liquid separation device;
a hydraulic cyclone (36) attached to the separation pipe (34), the hydraulic cyclone configured to receive fluid from the separation pipe;
at least one cyclone gas outlet (37) located in the upper side of the hydraulic cyclone (36); the at least one cyclone gas outlet configured to lead the gas entering the hydraulic cyclone (36) outside the hydraulic cyclone; and (Continued)

a liquid outlet (38) attached to the bottom part of the hydraulic cyclone (36), the liquid outlet configured to guide degassed fluid outside the hydraulic cyclone.

19 Claims, 4 Drawing Sheets

(51) Int. Cl.
  *C02F 1/38* (2006.01)
  *C02F 3/28* (2006.01)
(52) U.S. Cl.
  CPC .............. *C02F 3/2873* (2013.01); *C02F 1/38* (2013.01); *C02F 2203/006* (2013.01)
(58) Field of Classification Search
  USPC ........................................ 210/188, 603, 539
  See application file for complete search history.

(56) References Cited

U.S. PATENT DOCUMENTS

| | | | |
|---|---|---|---|
| 2012/0115218 A1* | 5/2012 | Frankena | ............... C12M 23/34 |
| | | | 435/294.1 |
| 2013/0319935 A1* | 12/2013 | Leitner | ................. C02F 3/2846 |
| | | | 210/603 |

* cited by examiner

DEGASSING DEVICE FOR ANAEROBIC PURIFICATION DEVICE

FIELD OF THE INVENTION

The invention relates to a degassing device for an anaerobic purification device.

BACKGROUND OF THE INVENTION

Anaerobic purification devices for purification of fluid, such as wastewater, are known in the art. EP 170 332 B1 discloses an anaerobic purification device wherein wastewater that contains organic material is subjected to a process in which dissolved organic material is broken down under anaerobic conditions. Fluid enters a reactor tank of the purification device. Gas, more specifically, biogas, is produced when the fluid with substances dissolved comes into contact with biomass located inside the tank. A circulation cycle of fluid is created, in which fluid is thrusted upwards together with the generated gas through a riser pipe, it reaches a degassing device located above the reactor wherein gas is separated from the fluid, and the gas leaves the device, while the fluid flows downwards in the downer pipe to the bottom of the reactor in order to be used again in the cycle.

It is important that efficient degassing takes place in the degassing device. If the gas is not efficiently released from the system, the fluid that flows downwards in the downer pipe towards the bottom of the reactor will still contain gas, which will tend to rise in the downer pipe and will cause fluctuations in the fluid flow, leading to big shocks. These shocks may cause physical damage to the installation.

The degassing devices known in the art, as that of EP 170 332 B1 or EP 1 888 471 B1, have several drawbacks: they are large, and they are therefore built from stainless steel. They have furthermore a complex shape, are built on top of the tank and need to withstand weather conditions. As a result, they require high manufacturing and assembling costs.

U.S. Pat. No. 4,053,291 A discloses a gas-oil separator wherein a gas-oil mixture is brought into a separation cylinder from an entry tube, wherein before the entry tube the mixture can go through an entrance tube with holes on the side wall.

US 2013/319935 A1 discloses a device for anaerobic purification of water comprising a separator for separating a mixture in sludge, water and gas and located in an upper part of the device, wherein the separator comprises a cyclone.

It is therefore desirable to have degassing devices for anaerobic purification devices, wherein the degassing devices have a simple structure which at the same time allows for efficient release of the gas from the system.

SUMMARY OF THE INVENTION

An objective of the present invention is to provide a new degassing device that intends to overcome at least one of the above mentioned disadvantages. The invention provides a degassing device that has good degassing properties since gas is allowed to leave the reactor through several paths, and the shape of the degassing device allows for an efficient flow of fluid.

Throughout the following description, an example of water, more specifically wastewater, will be disclosed. However, it should be understood that any other suitable fluid could also be used.

The invention provides a gas-liquid separation device for an anaerobic purification device for purification of wastewater, the gas-liquid separation device comprising:

a gas-liquid riser pipe;

a separation pipe attached to the gas-liquid riser pipe, the separation pipe defining an angle with the plane perpendicular to the gas-liquid riser pipe between −45 degrees and +45 degrees, the separation pipe configured to, in operation, receive fluid from the gas-liquid riser pipe;

at least one pipe gas outlet located, when assembled with an anaerobic purification device, in a surface along the separation pipe facing away from the ground, the at least one pipe gas outlet configured to, in operation, lead at least a portion of the gas in the separation pipe outside the gas-liquid separation device;

a hydraulic cyclone attached to the separation pipe, the hydraulic cyclone configured to, in operation, receive fluid from the separation pipe;

at least one cyclone gas outlet configured to, in operation, lead the gas entering the hydraulic cyclone outside the hydraulic cyclone; and a liquid outlet configured to, in operation, guide degassed fluid outside the hydraulic cyclone.

The at least one cyclone gas outlet may be located in the upper side of the hydraulic cyclone. The liquid outlet may be attached to the bottom part of the hydraulic cyclone.

The invention advantageously provides a design of the degassing device that facilitates the flow of fluid and the separation of the gas from the fluid. The angle under which the separation pipe is connected to the gas-liquid riser pipe determines the fluid uplift and the variations in flow. The angle can be altered on a case by case basis, depending on the fluid pollutant concentration, and has an allowable range between −45 degrees and +45 degrees.

An embodiment of the invention provides a gas-liquid separation device wherein the at least one pipe gas outlet is located, when assembled with an anaerobic purification device, in a surface of the separation pipe facing away from the anaerobic purification device.

Another embodiment of the invention provides a gas-liquid separation device wherein the separation pipe comprises a plurality of pipe gas outlets, preferably between two and ten, more preferably at least three, even more preferably four to six or five, and even more preferably three to six.

In a preferred embodiment of the present invention, a plurality of outlets are located in the surface of the separation pipe, so that the gas may leave the degassing pipe as it flows together with the fluid through the separation pipe. The number of outlets present in the separation may be one or more, preferably two or more, preferably five or more.

Another embodiment of the invention provides a gas-liquid separation device wherein the at least one pipe gas outlet has a diameter of between 10 millimeters and 150 millimeters, more preferably between 50 millimeters and 150 millimeters.

Another embodiment of the invention provides a gas-liquid separation device wherein the at least one pipe gas outlet has a diameter of between 100 millimeters and 400 millimeters, more preferably between 150 millimeters and 300 millimeters.

An embodiment of the invention provides a gas-liquid separation device wherein the gas-liquid riser pipe has a vertical orientation when assembled with an anaerobic purification device.

Another embodiment of the invention provides a gas-liquid separation device wherein the diameter of the separation pipe is equal to or greater than the diameter of the riser pipe.

Another embodiment of the invention provides a gas-liquid separation device wherein the diameter of the hydraulic cyclone is equal to or greater than the diameter of the separation pipe.

Another embodiment of the invention provides a gas-liquid separation device manufactured from plastic material, preferably from polypropylene.

Another embodiment of the invention provides a gas-liquid separation device comprising a plurality of riser pipes and a plurality of separation pipes, each of the riser pipes connected to each of the separation pipes, and wherein the plurality of separation pipes are connected to the hydraulic cyclone.

An advantageous embodiment of the invention provides a plurality of riser pipes and separation pipes in order to increase the amount of gas and fluid that arrives at the gas-liquid separation device, optimizing the degassing operation.

The invention further provides an anaerobic purification device comprising
  a reactor tank;
  a fluid collector located in the upper section of the reactor tank;
  at least one gas-collecting system for, in operation, collecting gas from the fluid contained in the reactor tank, the at least one gas-collecting system arranged at a level below the fluid collector;
  at least one gas-liquid separation device according to any one of the previous claims;
  at least one riser pipe connected to the at least one gas-collecting system and discharging into the at least one gas-liquid separation device; and
  a downer pipe connected to the at least one gas-liquid separation device and discharging into the bottom of the reactor tank.

A further embodiment of the invention provides an anaerobic purification device wherein the reactor tank comprises at least two gas-collecting systems of which the at least one gas-collecting system is a lower gas-collecting system and an upper gas-collecting system is located between the fluid collector and the lower gas-collecting system configured to remove gas from the fluid contained in the tank.

A further embodiment of the invention provides an anaerobic purification device wherein the riser pipe is configured to raise fluid contained in the reactor tank by gas lift action caused by gas collected in the at least one gas-collecting system.

A further embodiment of the invention provides an anaerobic purification device wherein the downer pipe is configured to return fluid from the at least one gas-liquid separation device to the bottom of the reactor tank.

A further embodiment of the invention provides an anaerobic purification device wherein the liquid outlet of the hydraulic cyclone of the gas-liquid separation device is connected to downer pipe, the liquid outlet being configured to guide the fluid from the gas-liquid separation device into the bottom part of the reactor tank of the anaerobic purification device.

A further embodiment of the invention provides an anaerobic purification device comprising a plurality of gas-liquid separation devices.

The invention further provides a method for purification of fluid such as wastewater by using the anaerobic purification device.

BRIEF DESCRIPTION OF THE FIGURES

On the attached drawing sheets.

DETAILED DESCRIPTION

Figure 1:
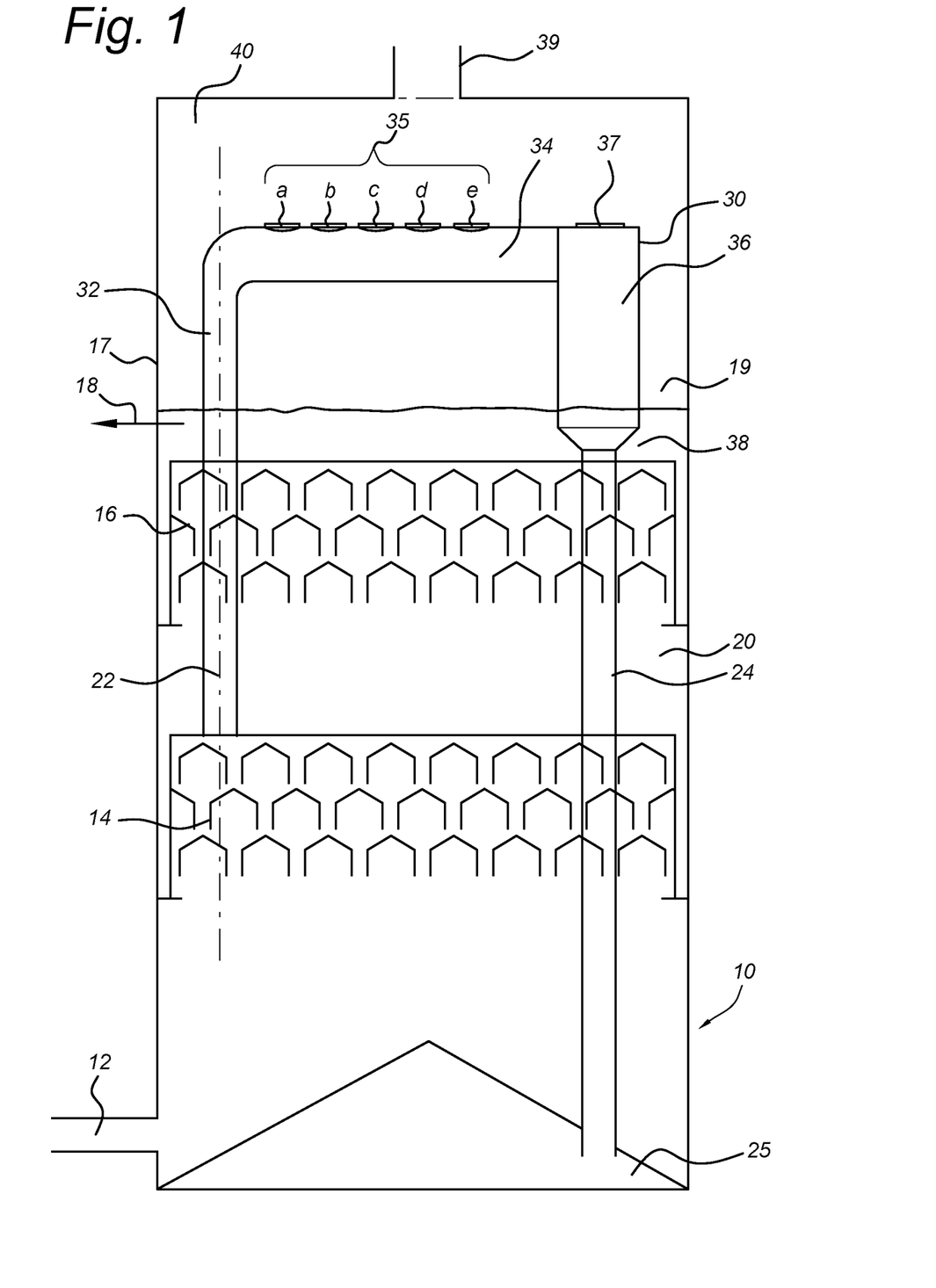
FIG. 1 schematically shows an anaerobic purification device with a gas-liquid separation device according to an embodiment of the invention.

FIG. 1 schematically shows an anaerobic purification device with a gas-liquid separation device according to an embodiment of the invention.

The anaerobic purification device of FIG. 1 comprises three parts: a reactor tank 10, a transportation system 20 and a gas-liquid separation device 30. The reactor tank comprises a fluid inlet 12 through which fluid, for example wastewater, to be purified, enters the anaerobic purification device under operating conditions. This fluid contains organic material with a specific level of COD (dissolved organic carbon measured as chemical oxygen demand), in other words, a specific amount of impurities. Impurities are converted into biogas as they pass through the biomass inside the reactor tank. In the upper part of the tank, a fluid collector 18 collects the clean fluid and guides it out of the anaerobic purification device.

When the fluid enters the tank 10 through the fluid inlet 12, the impurities dissolved in the fluid come into contact with biomass present in the tank, and biogas is produced. On its way up, the fluid traverses a plurality of gas-collecting systems, each comprising a plurality of hoods wherein the gas is retained.

Throughout the description, gas and biogas may be used interchangeably, since when referring to gas, it is the gas generated when the biomass comes in contact with the fluid and the dissolved impurities.

According to an embodiment of the invention, a lower gas-collecting system 14 collects gas contained in the fluid that rises through the reactor tank, and the lower gas-collecting system 14 guides the retained gas to the transport system 20. More specifically, the lower gas-collecting system 14 guides the gas to a riser pipe 22 through which the gas rises until it reaches the gas-liquid separation device 30. This gas contains fluid, and in the gas-liquid separation device 30, the gas and the fluid are separated, the gas being released, and the fluid being brought back to the bottom of the reactor tank 10 through a downer pipe 24. This fluid can in this way be recycled and again used in the purification cycle.

The fluid that keeps rising through the reactor tank 10 reaches then an upper gas-collecting system 16. Here, the gas that was not collected in the lower gas-collecting system 14 is collected and led into a gas headspace 40 located in the upper part of the reactor. Clean fluid reaches the top of the reactor tank 10 and leaves the tank through the fluid collector 11, and the gas that has risen to the gas headspace 40 leaves the tank through a system gas outlet 39.

The riser pipe 22 of the transport system ends in the gas-liquid riser pipe 32 of the gas-liquid separation device. Both pipes may be the same pipe, and therefore riser pipe and gas-liquid riser pipe 32 will be throughout the description used interchangeably.

The riser pipe 32 is connected to a separation pipe 34. The riser pipe 32 and the separation pipe 34 form an angle α which according to an embodiment of the invention may range from −45 degrees to +45 degrees. The angle α may also range from −45 degrees to +30 degrees. Said angle α is defined as the angle between the separation pipe 34 and plane perpendicular to the direction of the riser pipe 32, as will be described in detail with reference to FIG. 2. Depending on the pollution concentration of the fluid, it will be desirable to have a different angle between the riser pipe 32 and the separation pipe 34.

The riser pipe 32 may be located, when assembled with an anaerobic purification device, in a vertical orientation, or substantially vertical orientation.

At least one pipe gas outlet 35 is located along the surface of the separation pipe 34, more specifically, along the surface of the separation pipe facing away from the purification device when the gas-liquid separation device is mounted in the anaerobic purification device. Preferably, embodiments of the present invention include a plurality of pipe gas outlets 35, such as between two and ten. Different diameters for the pipe gas outlets may be used, so that more pipe gas outlets of smaller diameters or less pipe gas outlets of larger diameters can be chosen. It should be understood that the amount of pipe gas outlets may vary and may be chosen on a case by case basis. If the gas-liquid separation device is to be used in applications where large amounts of gas are generated, a higher number of pipe gas outlets 35 may be desirable so that a larger amount of gas can be released as it passes through the separation pipe 34.

The separation pipe 34 is connected to a hydraulic cyclone 36, so that the fluid and the gas that has not left the separation pipe through the pipe gas outlets 35 enters the hydraulic cyclone 36 for a last degassing step. The hydraulic cyclone 36, as is known in the art, is configured to, in operation, separate particles in a fluid based on the ratio of their centripetal force, which is high for dense particles and low for light particles. When the fluid and gas mixture enters the cyclone 36, the gas, which has a lower density, leaves the cyclone through a cyclone gas outlet 37 located in the upper part of the cyclone, and the fluid leaves the cyclone through the liquid outlet 38 located in the lower part of the cyclone. This outlet is the inlet of the downer pipe 24, and the degassed fluid flows downwards through it to reach the bottom of the tank 10 ready to be used again in the recirculation system.

The reactor tank according to embodiments of the invention is a closed space, completely sealed so that the purification of fluid can take place anaerobically, and the gas located inside the reactor is under a specific pressure.

In a preferred embodiment of the invention, the gas-liquid separation device 30 and the reactor tank 10 are assembled inside the same closed structure or reactor vessel, and the gas-liquid separation device 30 is placed above the reactor tank 10. In the upper part of the reactor vessel that covers the gas-liquid separation device 30 and the reactor tank 10 there is located the gas headspace 40 and the system gas outlet 39. The gas that leaves the gas-liquid separation device 30 through the pipe gas outlets 35 and the cyclone gas outlet 37 rises until the gas headspace 40 and from there it leaves the system through the system gas outlet 39. In the embodiment shown in FIG. 1, the system gas outlet is located in a central area of the roof of the closed structure, but the invention is not limited thereto, and the system gas outlet may be located in any place in the upper section of the closed structure that allows the gas to naturally flow out of the system.

The fact that the gas-liquid separation device 30 is isolated from the outside environment makes it possible for it to be made out of plastic or any other equivalent suitable material, since it does not need to withstand the atmospheric conditions, reducing the manufacturing costs.

Although in the embodiment shown in FIG. 1 the gas-liquid separation device 30 is located above the reactor 10, according to embodiments of the invention it is possible that it is located in a different position depending on the space and characteristics of the place where the device is to be mounted. As an alternative embodiment, the gas-liquid separation device may be located outside the closed structure, more specifically next to the reactor, and the gas that leaves through pipe gas outlets 35 and cyclone gas outlet 37 may be led through additional pipes to the gas headspace 40 so that it can leave the system through the system gas outlet 39.

Figure 2:
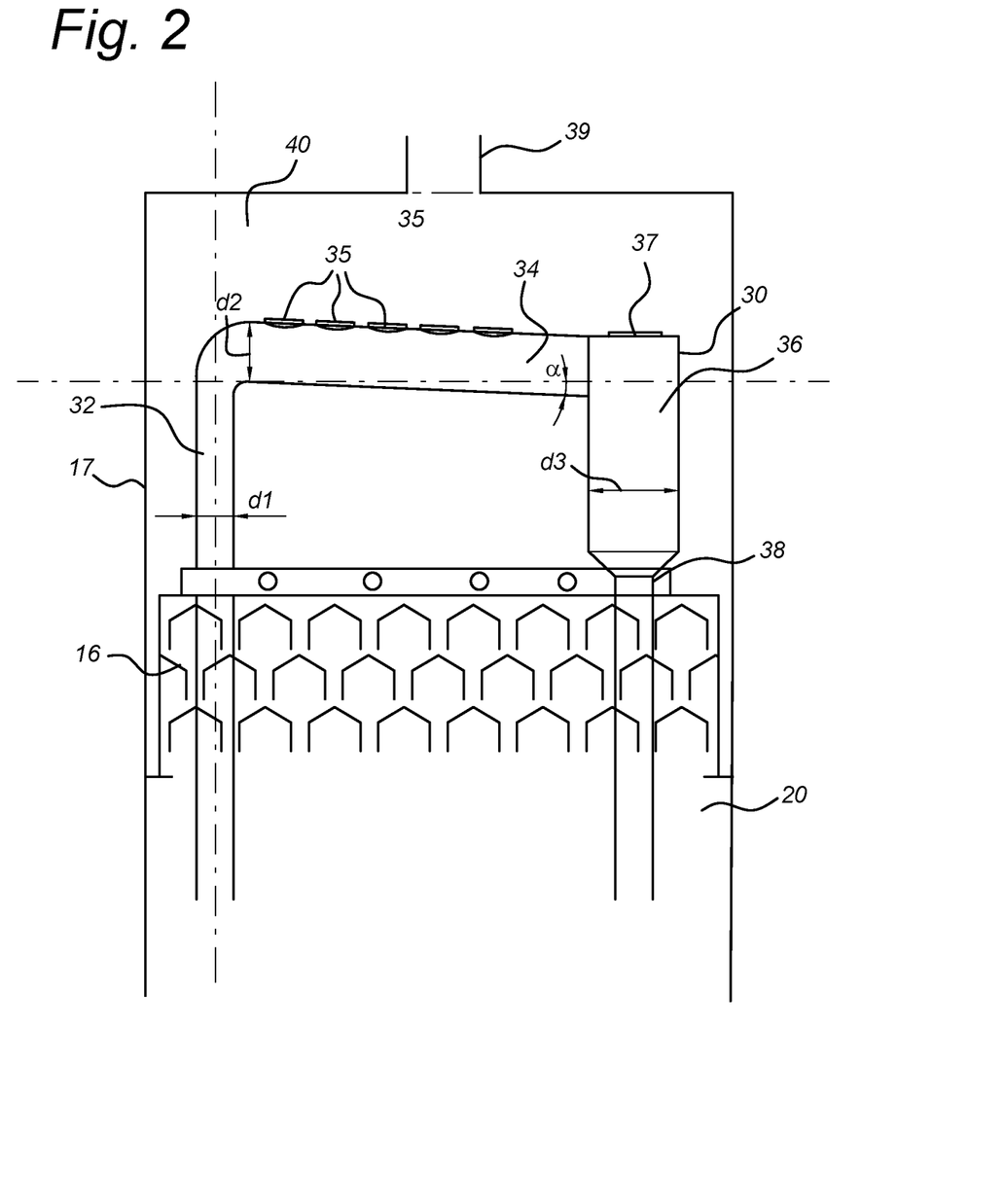
FIG. 2 shows the upper part of the anaerobic purification device with the gas-liquid separation device according to an embodiment of the invention.

FIG. 2 shows the upper part of the anaerobic purification device with the gas-liquid separation device according to an embodiment of the invention.

In FIG. 2, the riser pipe 32 has a vertical orientation when mounted in the anaerobic purification device. The riser pipe may have another orientation, but the more vertical the orientation is, the smoother the fluid and gas may rise through the riser pipe, since they can follow the gas natural path without being hindered by the walls of the pipe.

The angle α formed between the plane perpendicular to the riser pipe 32 and the separation pipe 34 is represented. This angle may be selected from a range between −45 degrees and +45 degrees. In this way, if α is 0 degrees, it means that the separation pipe is oriented perpendicular to the riser pipe. If α is −45 degrees, it means that the riser pipe and the separation pipe form an angle of 45 degrees, and if α is +45 degrees, it means that the riser pipe and the separation pipe form an angle of 135 degrees. It should be understood that the calculation of α according to embodiments of the present invention is one implementation option, but other reference systems may be used.

The tilt angle of the separation pipe, together with the fluid level inside the reactor tank, determines the fluid uplift and the variations in flow. The further the angle α is from −45 degrees, the smaller the energy that the fluid flow has in the separation pipe, and therefore the lower the energy with which it enters the hydraulic cyclone.

The diameter d1 of the riser pipe 32 is preferably smaller than the diameter d2 of the separation pipe 34. In this way, although both fluid and gas rise through the riser pipe, when they enter the separation pipe, the mixture does not reach the upper surface of the pipe, and therefore only the gas can leave the separation pipe through the pipe gas outlets 35, while fluid will not leave the separation pipe and will continue flowing to reach the hydraulic cyclone 36.

The diameter d3 of the hydraulic cyclone 36 is preferably higher than the diameter d2 of the separation pipe 34.

Figure 3:
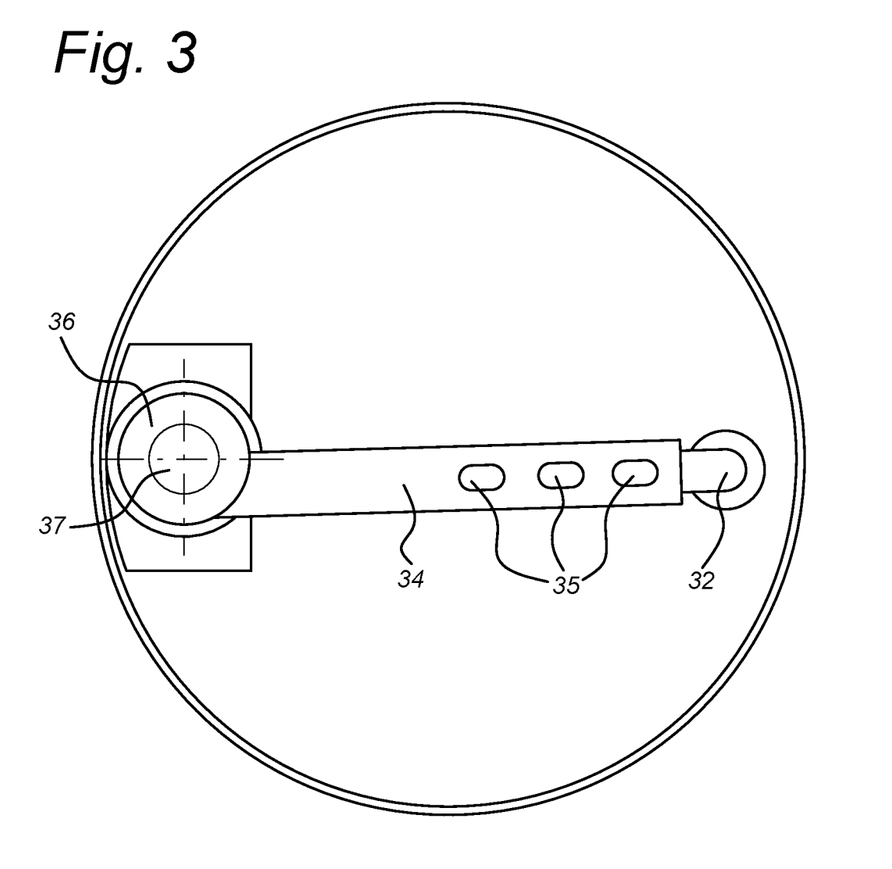
FIG. 3 illustrates a top view of the gas-liquid separation device in the anaerobic purification device according to an embodiment of the invention.

FIG. 3 illustrates a top view of the gas-liquid separation device in the anaerobic purification device according to an embodiment of the invention, without including the roof of the closed structure that covers the gas-liquid separation device.

As seen in FIG. 3, the pipe gas outlets 35 and the cyclone gas outlet 37 are located in a surface of the separation pipe 34 and the cyclone 36, respectively, facing away from the purification device, this is, facing away from the ground, which is a convenient location for the gas to leave the device naturally by going up.

From the perspective view of FIG. 3 it can be seen that the separation pipe 34 is connected to the hydraulic cyclone 36 in an off-centred position. This is needed to get the required rotation effect in the hydraulic cyclone 36.

Figure 4:
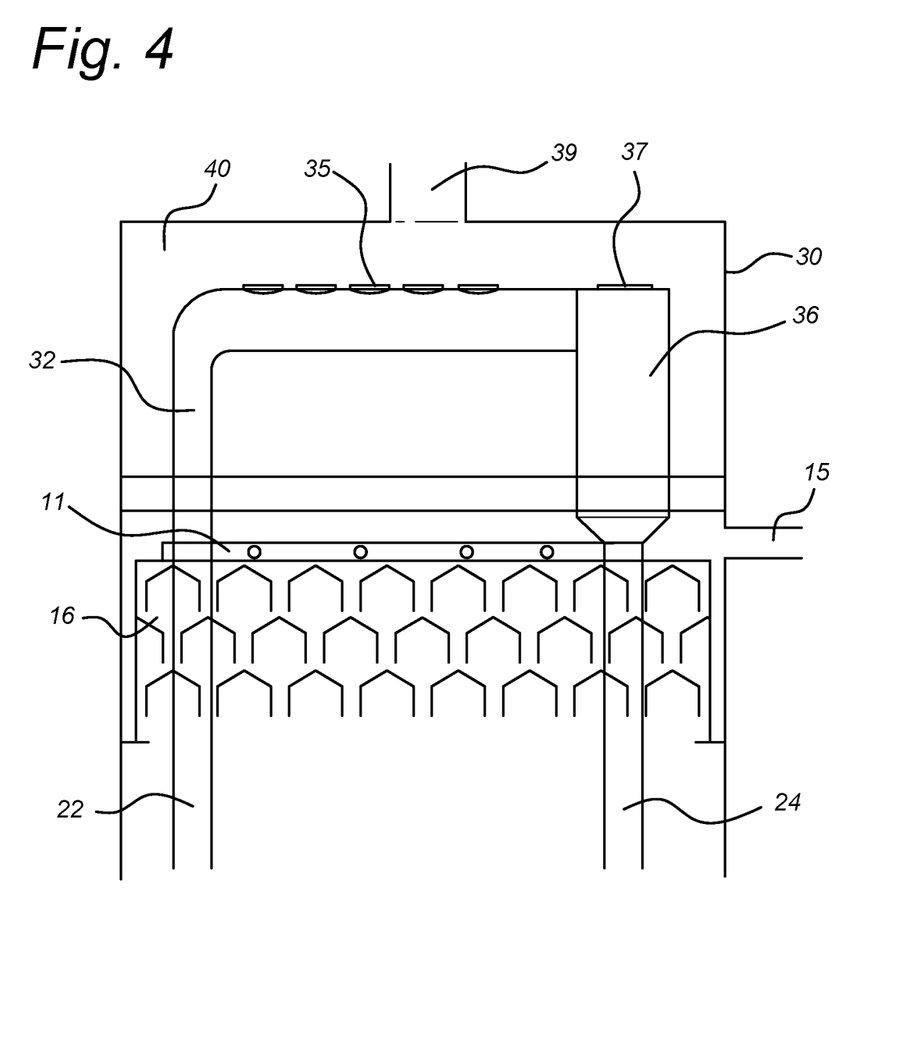
FIG. 4 shows the upper part of the anaerobic purification device with the gas-liquid separation device according to another embodiment of the invention.

FIG. 4 shows the upper part of the anaerobic purification device with the gas-liquid separation device according to another embodiment of the invention.

In this advantageous embodiment of the invention, the fluid level in the reactor tank 10 may be efficiently varied within a predetermined range. This can be achieved by means of an additional fluid outlet 15, located in the upper section of the reactor tank 10, below a lower boundary of the predetermined range. This fluid outlet 15 may allow fluid that reaches the top of the reactor tank 10 to leave the device. The amount of fluid that may leave the device through the fluid outlet may be controlled by fluid level control means. By controlling the flow of liquid through fluid outlet 15, for example by means of controlling a valve based on gas production measurements and/or fluid level measurement, the fluid level in the reactor can be controlled. By controlling the fluid level, the relative pressure between the fluid in the gas separation device 30 and the pressure at the fluid level can be controlled. This in turn influences the rate the at which a mixture of liquid and gas rises through riser pipe 32. Applicant has found that when gas production is relatively high, it is advisable to decrease the fluid level so that the gas-rich fluid can go through a path that is long enough for it to reach the gas-liquid separation device without unwanted fluctuations. On the other hand, when the gas production is relatively low, the fluid level may be increased in order to reduce the path that the gas and liquid have to follow through the riser pipe 32 towards the separation pipe 34.

The gas-liquid separation device according to embodiments of the present invention has a size smaller than the gas-liquid separation devices of the prior art, and a simpler shape. Furthermore, the fact that it is isolated from the outside environment makes it possible for it to be built from plastic, such as polypropylene, resulting in less manufacturing costs and an improved resistance against meteorological conditions when located in an outdoor location.

The specific design of the gas-liquid separation device of the present invention permits that the energy of the fluid that flows through the separation pipe 34 is controlled by determining the values of the angle α, the diameter of the separation pipe and the length of the separation pipe.

A coarse tuning of the force in the fluid flow in the separation pipe 34 can be achieved with the adjustment of the above mentioned parameters. A fine tuning can be achieved by varying the fluid level in the reactor tank, such that depending on the amount of gas generated in the system, a higher or lower level of fluid is maintained and therefore it is avoided that the gas and fluid that reach the gas-liquid separation device arrive at it with too much force that generates turbulence or with too little force that gives not enough energy to the fluid to then flow down to the bottom of the reactor.

According to a further embodiment of the invention, although not disclosed in the accompanying drawings, the gas-liquid separation device may comprise more than one gas-liquid riser pipe 32 and more than one separation pipe 34, so that more than one circulation paths are created for the gas and fluid retained in the lower gas-collecting system. According to an embodiment of the invention, the multiple separation pipes 34 may each be connected to one hydraulic cyclone 36. According to another preferable embodiment of the invention, the multiple separation pipes 34 may be all connected to one and the same hydraulic cyclone 36. The amount of gas-liquid riser pipes 32 and separation pipes 34 that best suits an anaerobic purification device may be chosen depending on the amount of fluid to be purified in the purification device.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE SYMBOLS

Similar reference numbers that have been used in the description to indicate similar elements (but differing only in the hundreds) have been omitted from the list below, but should be considered implicitly included.

10 Reactor tank
11 Fluid collecting device
12 Fluid inlet
14 Lower gas-collecting system
15 Fluid outlet
16 Upper gas-collecting system
18 Fluid collector
19 Fluid level
20 Transportation system
22 Riser pipe
24 Downer pipe
25 Downer pipe discharge
30 Gas-liquid separation device
32 Gas-liquid riser pipe
34 Separation pipe
35 Pipe gas outlet
36 Hydraulic cyclone
37 Cyclone gas outlet
38 Liquid outlet
39 System gas outlet
40 Gas headspace
α Tilt angle
d1 Riser pipe diameter
d2 Separation pipe diameter
d3 Hydraulic cyclone diameter

The invention claimed is:

1. A gas-liquid separation device for an anaerobic purification device for purification of wastewater, the gas-liquid separation device comprising:
a gas-liquid riser pipe;

a separation pipe attached to the gas-liquid riser pipe, the separation pipe defining an angle with a plane perpendicular to the gas-liquid riser pipe between −45 degrees and +45 degrees, the separation pipe configured to, in operation, receive fluid from the gas-liquid riser pipe;

at least one pipe gas outlet located, when in operation, in a surface along the separation pipe facing away from the ground in an upwards direction, the at least one pipe gas outlet configured to, in operation, lead at least a portion of the gas in the separation pipe outside the gas-liquid separation device;

a hydraulic cyclone attached to the separation pipe, the hydraulic cyclone configured to, in operation, receive fluid from the separation pipe;

at least one cyclone gas outlet configured to, in operation, lead the gas entering the hydraulic cyclone outside the hydraulic cyclone; and a liquid outlet configured to, in operation, guide degassed fluid outside the hydraulic cyclone.

2. The gas-liquid separation device according to claim 1, wherein the separation pipe comprises a plurality of pipe gas outlets.

3. The gas-liquid separation device according to claim 1, wherein the at least one pipe gas outlet has a diameter of between 100 millimeters and 400 millimeters.

4. The gas-liquid separation device according to claim 1, wherein the gas-liquid riser pipe has a vertical orientation when in operation.

5. The gas-liquid separation device according to claim 1, wherein the diameter of the separation pipe is greater than the diameter of the riser pipe.

6. The gas-liquid separation device according to claim 1, wherein the diameter of the hydraulic cyclone is equal to or greater than the diameter of the separation pipe.

7. The gas-liquid separation device according to claim 1, being manufactured from plastic material.

8. The gas-liquid separation device according to claim 1, comprising a plurality of riser pipes and a plurality of separation pipes, each of the riser pipes connected to each of the separation pipes, and wherein the plurality of separation pipes are connected to the hydraulic cyclone.

9. The gas-liquid separation device according to claim 2, wherein the plurality of pipe gas outlets is between two and ten.

10. The gas-liquid separation device according to claim 3, wherein the at least one pipe gas outlet has a diameter of between 150 millimeters and 300 millimeters.

11. The gas-liquid separation device according to claim 7, being manufactured from polypropylene.

12. The gas-liquid separation device of claim 1, wherein the separation pipe connects to the gas-liquid riser pipe at an angle which is not 90 degrees.

13. An anaerobic purification device comprising:
a reactor tank;
a fluid collector located in the upper section of the reactor tank;
at least one gas-collecting system for, in operation, collecting gas from the fluid contained in the reactor tank, the at least one gas-collecting system arranged at a level below the fluid collector;
at least one gas-liquid separation device of claim 1;
at least one riser pipe connected to the gas-liquid riser pipe of the at least one gas-collecting system and discharging into the at least one gas-liquid separation device; and
a downer pipe connected to the liquid outlet of the at least one gas-liquid separation device and discharging into the bottom of the reactor tank.

14. The anaerobic purification device according to claim 13, wherein the reactor tank comprises at least two gas-collecting systems of which the at least one gas-collecting system is a lower gas-collecting system and an upper gas-collecting system is located between the fluid collector and the lower gas-collecting system.

15. The anaerobic purification device according to claim 13, wherein the riser pipe is configured to raise fluid contained in the reactor tank by gas lift action caused by gas collected in the at least one gas-collecting system.

16. The anaerobic purification device according to claim 13, wherein the downer pipe is configured to return fluid from the at least one gas-liquid separation device to the bottom of the reactor tank.

17. The anaerobic purification device according to claim 16, wherein the liquid outlet of the hydraulic cyclone of the gas-liquid separation device is connected to downer pipe, the liquid outlet being configured to guide the fluid from the gas-liquid separation device into the bottom part of the reactor tank of the anaerobic purification device.

18. The anaerobic purification device according to claim 13, wherein comprising a plurality of gas-liquid separation devices.

19. A method for purification of fluid such as wastewater by using an anaerobic purification device according to claim 13, the method comprising:
introducing wastewater into the reactor tank;
collecting and guiding biogas to the at least one riser pipe with the at least one gas collection system;
separating the biogas and fluid with at least one gas-liquid separation device; and
releasing the biogas; and
flowing the fluid to the bottom of the reactor tank through the downer pipe.

* * * * *